United States Patent [19]

Carn

[11] 3,976,739
[45] Aug. 24, 1976

[54] PROCESS FOR MOLDING A PNEUMATIC TIRE HAVING A WIDE BEARING SURFACE

[76] Inventor: Patrick Carn, Route de Benodet, 29000 Quimper, France

[22] Filed: Apr. 22, 1974

[21] Appl. No.: 462,647

[30] Foreign Application Priority Data
   Apr. 20, 1973   France ........................... 73.15613
   Apr. 4, 1974   France ........................... 74.11994

[52] U.S. Cl. ........................ 264/219; 264/250; 264/259; 264/294; 264/310; 264/311; 264/326; 264/347; 264/DIG. 59
[51] Int. Cl.² .................... B29C 5/04; B29H 17/00
[58] Field of Search .......... 264/250, 255, 310, 311, 264/326, DIG. 59, 259, 294, 296, 219, 261, 347; 152/330 R, 339

[56] References Cited
UNITED STATES PATENTS

| | | | |
|---|---|---|---|
| 2,189,154 | 2/1940 | Stewart | 264/258 |
| 2,273,283 | 2/1942 | Pfeiffer | 264/326 |
| 2,324,974 | 7/1943 | Greenup | 264/326 |
| 2,994,919 | 8/1961 | Schafer et al. | 264/311 |
| 3,686,389 | 8/1972 | Beneze | 264/250 |

*Primary Examiner*—Willard E. Hoag
*Attorney, Agent, or Firm*—Weiser, Stapler & Spivak

[57] ABSTRACT

A process for molding a tire having a wide bearing surface comprising the steps of molding reinforcing shoulders in a static mold and partially curing the molded materials; removing the partially cured shoulders from the static mold and placing them in a rotating mold; introducing additional plastic material into the rotating mold and rotating the mold; and then heating the mold to complete the curing of the shoulders and to fully cure the additional plastic material to form the tire casing.

6 Claims, 3 Drawing Figures

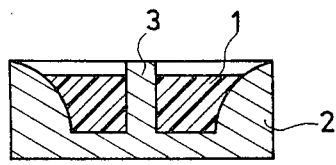
FIG. 1
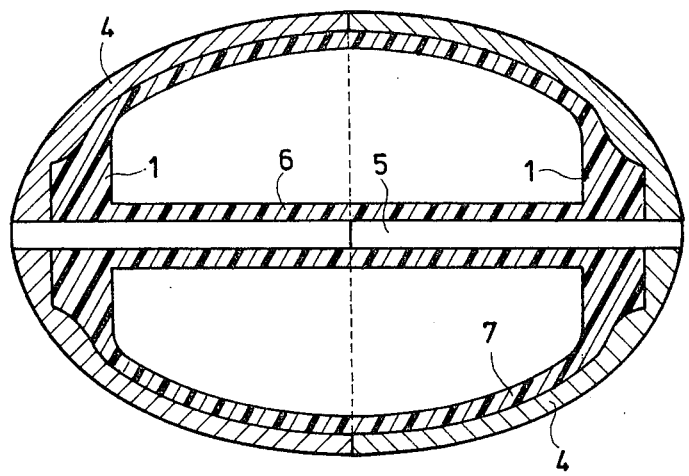
FIG. 2
FIG. 3
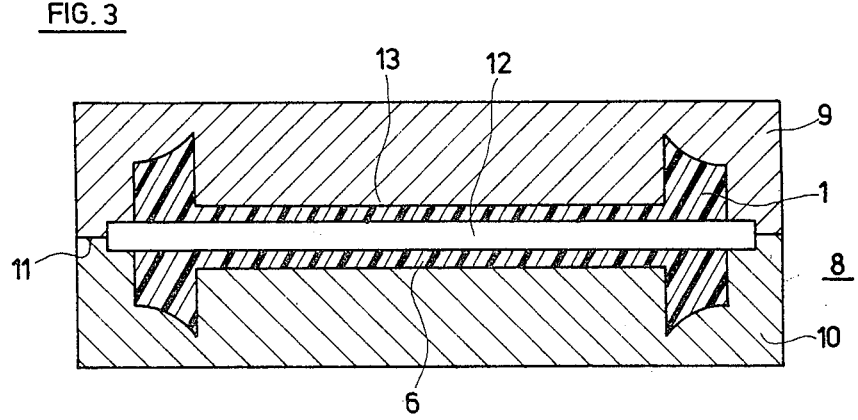

PROCESS FOR MOLDING A PNEUMATIC TIRE HAVING A WIDE BEARING SURFACE

BACKGROUND OF THE INVENTION

The invention concerns a molding process for making a pneumatic tire having a wide configuration and a wide surface for rolling, that is a wide tread for the portion of the tire which touches the ground.

The tire is particularly well suited for all types of ground surfaces, particularly uneven road beds. When the tire is inflated to a low pressure, it is wider that it is high and has a profile that is more or less eliptical in cross section. It is known to use tires having a wide road contact surface which are inflated at a low pressure to carry a load on grounds which are stony, sandy or otherwise generally not made into roads. Because these tires are fabricated wider than they are high, they have less tendency to get stuck in the sand or to be arrested by various articles. Such tires when cut transverse and viewed in cross section have a profile that is more or less eliptical. Such tires are advantageously manufactured from synthetic plastic material such as polyvinylchloride, which is hot molded in accordance with known processes of the thermal plastic industry. The most common process for obtaining such tires comprises molding by rotation. The material to be molded is introduced into a mold and the mold is rotated and heated in order to obtain a spreading or a placing of the plastic material on the internal walls of the mold and a curing or gelification, that is, hardening of the plastic molded material. The term gelification or curing is used more particularly with certain plastic materials, particularly polyvinylchloride when it passes from the liquid solution state to the solid state under the action of heat.

In such a process, the plastic material has a tendency to spread rather uniformly on the internal walls of the mold while the mold is rotating. Experience has shown that the tires so obtained have weaknesses when under load, particularly when these tires have their extremities, which have their smallest diameter, traversed by a carrying axis. The quantity of plastic material at the level of the axis of the wheel and at each extremity of this axis is too weak to resist the load of the carried weight. Additionally, the strain due to the running of the wheel causes frequent breakdown of the tire, particularly between the extremities of the axis of the tire and the road contacting surface which is related thereto.

To correct these shortcomings, reinforcing the extremities of the tires close to the carrying axis by various means has been attempted such as by employing the assistance of supports such as, for example, containers which partially hold the casing. These means are difficult and complicated to put into effect, they cause a heterogenious or nonhomogenious tire structure and the cost of manufacture is considerably increased.

In U.S. Pat. No. 3,470,933 to Molnar, a method of molding an entire tire by rotational molding is disclosed. However, the use of preformed reinforced extremities is not taught or suggested.

SUMMARY OF THE INVENTION

The present invention has as an object the manufacture of the type of tire described above which is obtained directly from molding. The tire which is made available in accordance with the present invention comprises homogenious monobloc of a body which is reinforced in thickness in the areas or zones where the stresses concentrate when the wheel is under load and when the tire is subjected to strains and stresses due to the use of the wheel.

The invention has as an object the introduction of a procedure for molding a rubber or other suitable material pneumatic tire having a wide band of contact with the road. The band is wider than the tire is high, that is, the height is less than the width. The tire has an eliptical cross-sectional profile and the smaller extremities of the diameter of this tire constitute a support for a transverse axis. A tubular element connects said extremities of the tire to serve as a guide for the axis and as a brace for maintaining the distance between said extremities which connect with the tubular element. The procedure for molding is characterized or comprised as follows:

a. The elements constituting the hub or axis, notably the reinforced extremities forming the support, are maufactured in a premolded static phase.

b. The cross linking or curing of the plastic material is limited or controlled so that it still has qualities of tackiness or stickiness.

c. The casing of the tire is manufactured and it is connected or attached to the hub or axis in a dynamic molding phase which comprises placing the axis or hub of the tire which has been obtained in the first premolded static phase in a rotating mold, introducing into this mold the material for molding the casing, rotating the loaded mold, and then heating it to complete curing of the axis and of the outer shell, casing or outer band of the tire.

The invention also provides a wheel having a large ground contacting band identifiable in that the wheel has certain areas or zones of greater thickness in close proximity to its extremities. These zones are obtained or effectuated by the combination of a tubular element and by a casing, that is the ground contacting band forming a unitary monobloc.

It is another object of the present invention to provide a novel process for molding pneumatic tires which employs partially cured plastic materials to which are added additional plastic materials and the composite materials are fully cured together.

It is another object of the present invention to provide a novel process for molding pneumatic tires that is inexpensive in production, uncomplicated in design and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a cross sectional view illustrating a first phase of the static molding for producing the zones of reinforcement at the center or the axis of the tire.

FIG. 2 is a cross sectional view illustrating the phase of the dynamic molding of the tire to form the casing and its connection to the reinforced zones.

FIG. 3 is a sectional side view illustrating a second phase of the static mold of the axis of the tire.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings, and are not intended to define or limit the scope of the invention.

In accordance with the first embodiment of the invention, with reference to FIGS. 1 and 2, during the first phase of the process there is carried out a static premolding of the thick shoulders or supports with a thermo-setting plastic in static molds 2 which are heated to a moderate temperature of about 120°C. for a relatively short time of about 10 minutes. The shoulders or supports 1 are precured in this manner so that they conserve the possibility to be joined or made to adhere to another part made of the same material which is brought in contact therewith later. So that they will retain an amount of tackiness, that is the plastics are not totally cured, the plastic material is cured just enough to maintain a tacky but not flowing surface. In accordance with the invention, these plastic materials are precured. This would not be the case if the shoulders or end caps 1 were cured at temperatures higher than 150°C. for more than the ten minutes called for.

The shoulders, supports or sidewalls 1 take a lens-like shape and they are axially transversed in their respective centers by a central strut 3 of the mold 2. The mold is so fabricated as not to be deformed by the second phase of the process.

In the fabrication of the premolded axis as represented in FIG. 3, the axis 13 or heart of the tire is first formed by a static premolding in a mold 8 which has two portions 9 and 10 respectively linked at the connecting junction 11. In the center of the mold there is introduced a provision for a cavity 12 in the form of a cylindrical axis member. The mold comprises in the vicinity of the extremities of the axis circular chambers having the desired profile of the shoulders 1. A cylindrical passage 13 joins the two chambers at the extremities of the mold in order to form a connecting brace when the cavity of the mold is filled in the configuration of a tubular element which joins the two shoulders. There is obtained in accordance with this process a center axis or monobloc in the shape of a bobbin which is particularly resistant to stress and which is suitable to receive in the dynamic molding phase, the material which is to constitute the rolling portion or casing of the tire. This material will adhere itself to the material to which the center is made and with which it makes a uniform body after curing. At least the two shoulders and the center portion are in accordance with a preferred mode of execution of the invention. The tire shoulders 1 and brace 6 are made of a material which will be harder after curing than the plastic material forming the ground contacting surface of the wheel. In the procedure of molding of the center monobloc 6, the entirety of this inner part is made of a plastic material which is harder after curing than the plastic forming the ground contacting band or casing.

In the process of the dynamic molding, the reinforcing shoulders 1 obtained in accordance with either of the phases of premolding which have been described in connection with the description of FIGS. 1 or 3 are placed in a rotating mold 4 which transversed by axis 5 having the same diameter that the axial passage between the extremities of shoulders, end caps or sidewalls 1 and of the tube, brace, hub or axial portion 6. See FIG. 2.

The curable plastic fluid 7 is placed in mold 4 when curing to mold at approximately 150°C. and the mold 4 is rotated. The plastic material 7 is spread while curing and solidifying on the heated sides of the mold 4 and is struck or made to firmly adhere to the periphery of shoulders 1 during the rotary operation of the mold 4.

After removing from the mold formed by the separation of the two parts of mold 4, there is obtained a tight, water proof tire transversed by tube 6 which is capable of receiving the axle of rotation of the wheel. The wheel or tire is thereby reinforced at its extremities at the very place where the axis transmits the weight of the load. The heavy shoulders 1 can be advantageously molded of a synthetic plastic material having a hardness greater than that of the curable material 7 to give to the side a certain rigidity. In this manner, the increased material and increased hardness prevents the deformation and offers to the extremities a wall which is subject to little deformable or plyability and produces a tire which is more deformable on the casing or ground contacting band.

It has been found useful to use as molding plastic materials polyvinylchloride, plasticized with a material called plastisol. The rotating speed of the mold can be between 5 and 30 revolutions per minute. After the curing, the casing can have a shore hardness between 70 and 80° whereas the shoulders 1 will have a hardness between 80 and 95°. It is well understood that the invention is not limited to the means of application described above and the realization of the few examples which are shown but encompasses all the other variance.

I claim:

1. A method of molding a pneumatic tire having two axially spaced sidewall portions, said sidewall portions being integrally interconnected by an apertured axial portion, said tire also having a further portion, radially spaced from said apertured axial portion and integrally interconnecting said two spaced sidewall portions, said method comprising:
   a. molding in a static mold a pair of axially spaced and interconnected tire sidewall portions from a first curable elastomeric composition and partially curing said elastomeric composition, said sidewall portions being interconnected by an axially apertured portion;
   b. inserting said sidewall portions in a second mold;
   c. introducing into said second mold a second curable elastomeric composition different from said first curable elastomeric composition and bondable thereto;
   d. rotating said second mold to distribute said second curable elastomeric composition in the second mold and to contact said two sidewall portions with said second elastomeric composition and to adhere said second elastomeric composition to said sidewall portions;
   e. curing said first and second elastomeric materials; thereby forming said pneumatic tire.

2. The method of claim 1 additionally including forming a two part mold having a mold cavity in said two parts adapted to form said two spaced sidewall portions and an axial portion interconnecting said sidewall portions.

3. The method of claim 2 including axially aligning said two sidewall portions and said apertured portion with said second mold.

4. The method of claim 2 including inserting an axis member in the aperture of said axially apertured portion in said second mold.

5. The method of claim 2, including filling said mold cavity with said first elastomeric material to form said two spaced sidewall portions and said axial portion.

6. The method of claim 5, further including introducing into said mold cavity means for providing an axial aperture in said axial portion.

* * * * *